Patented Feb. 17, 1948

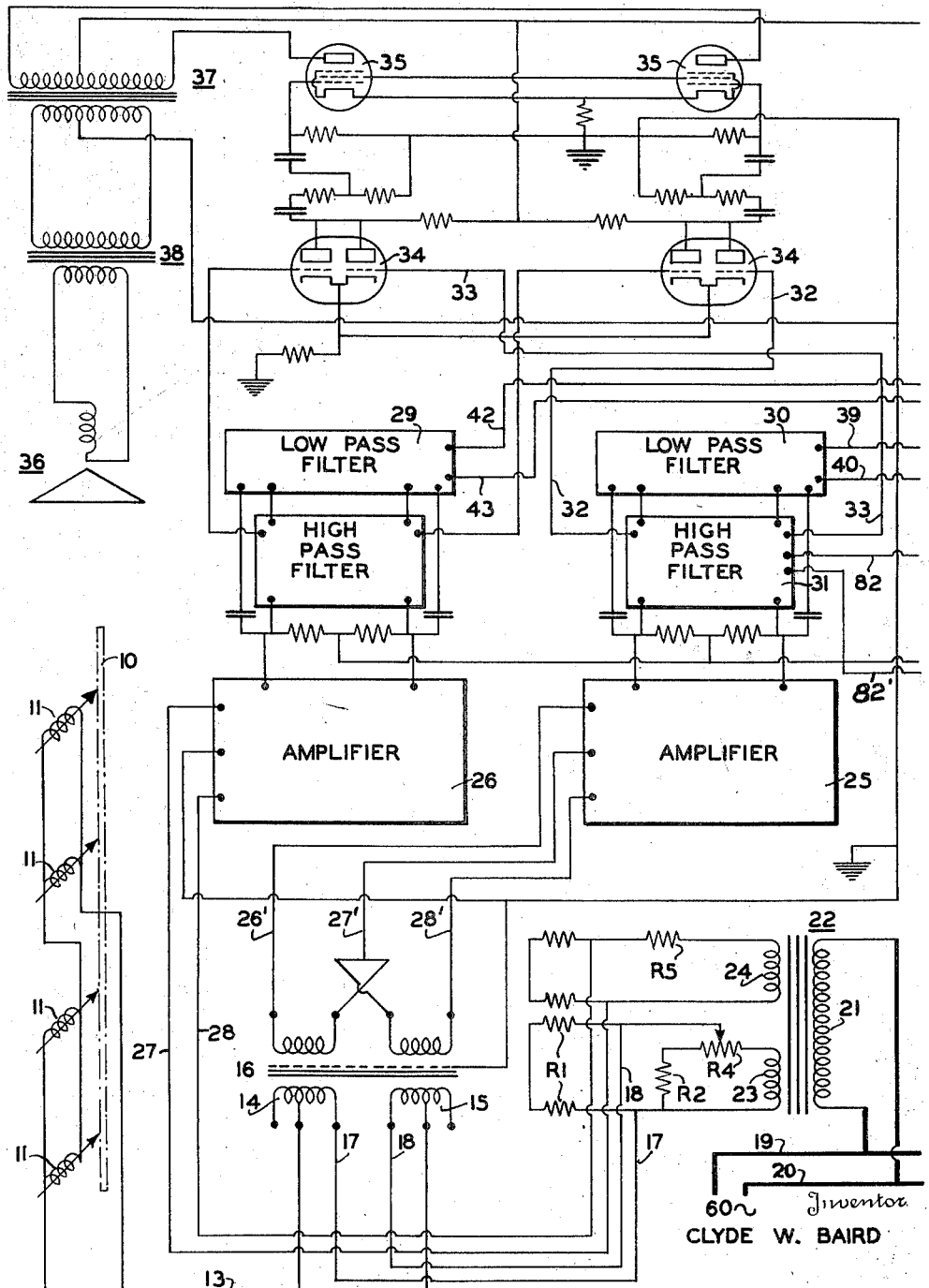

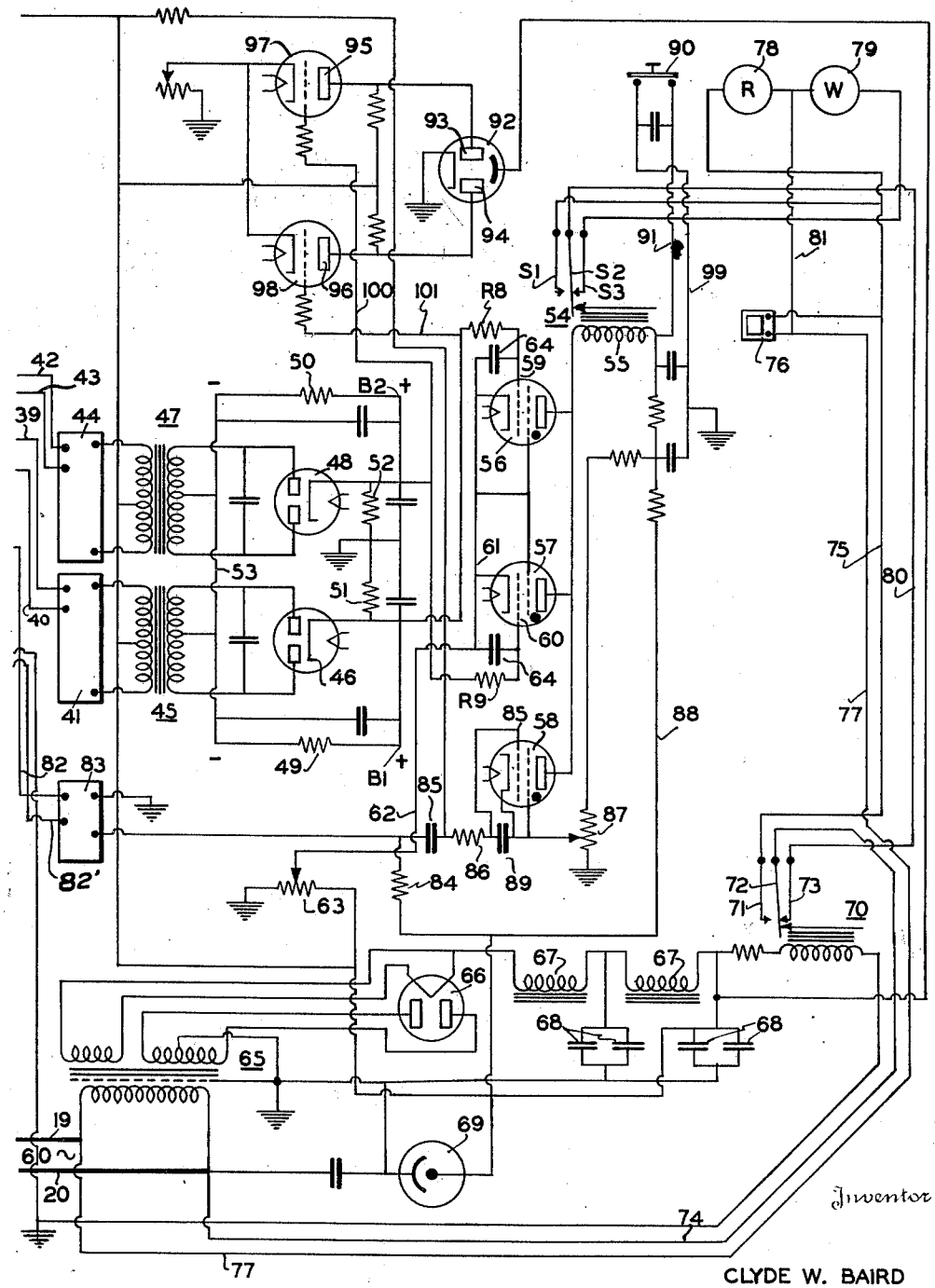

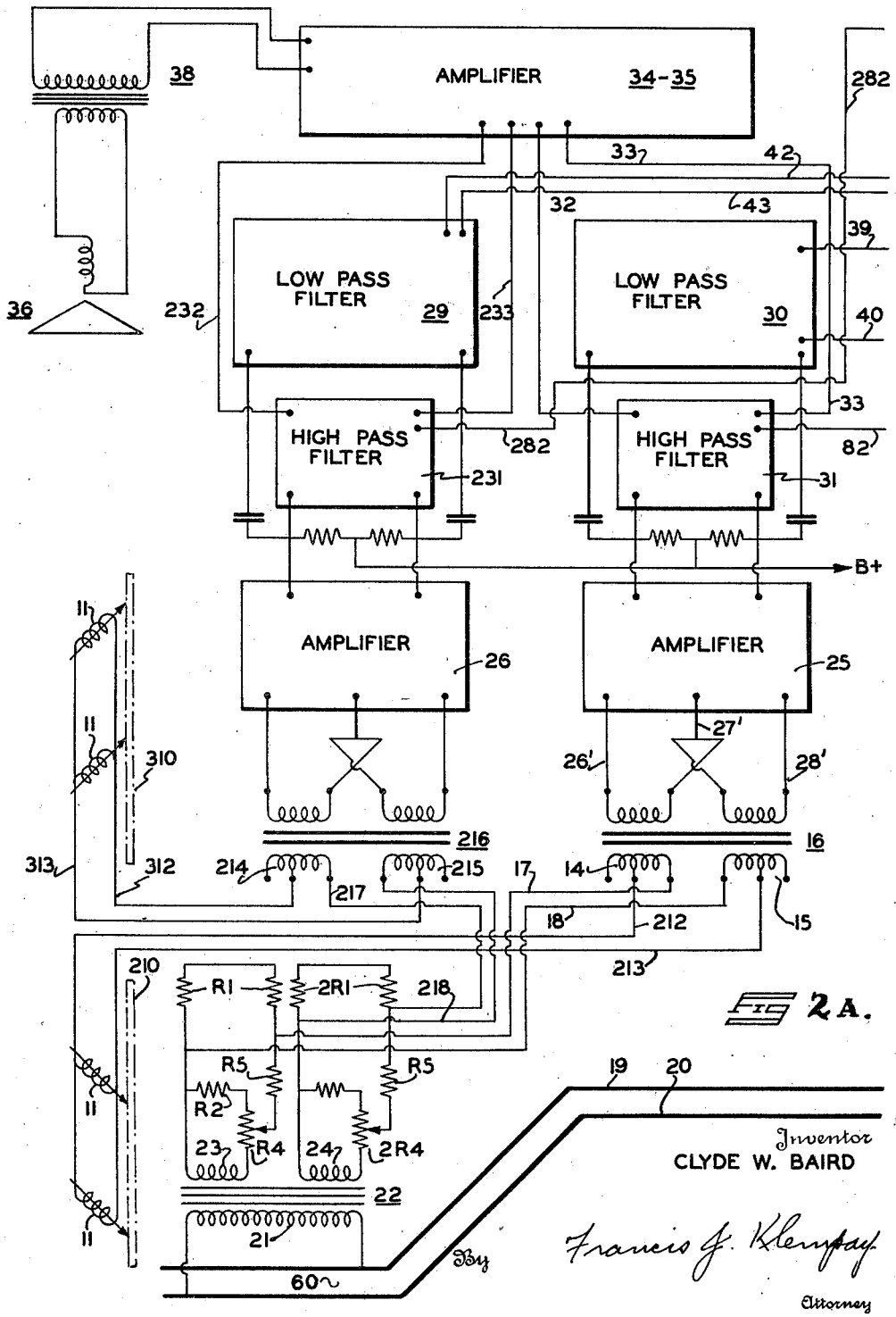

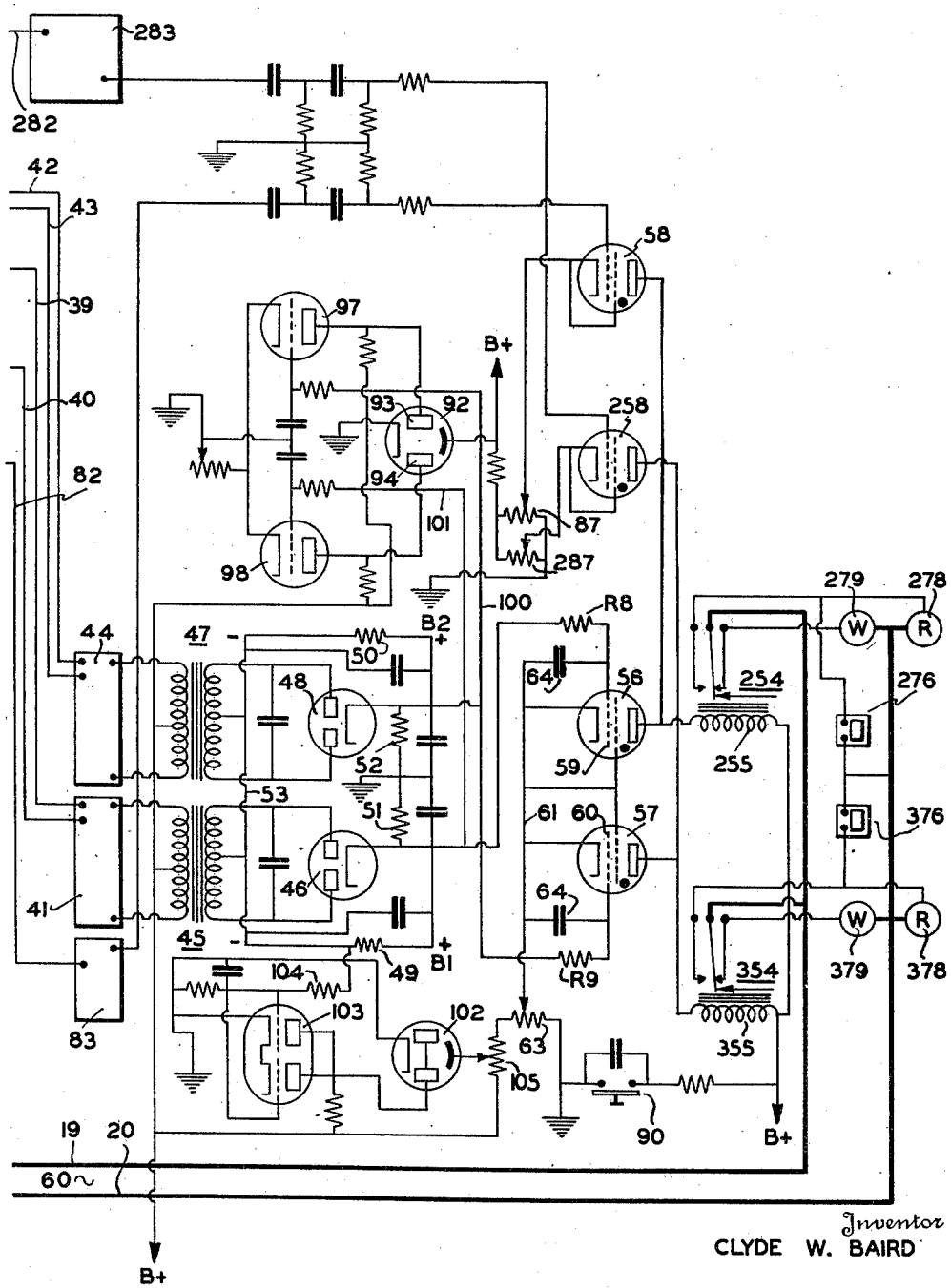

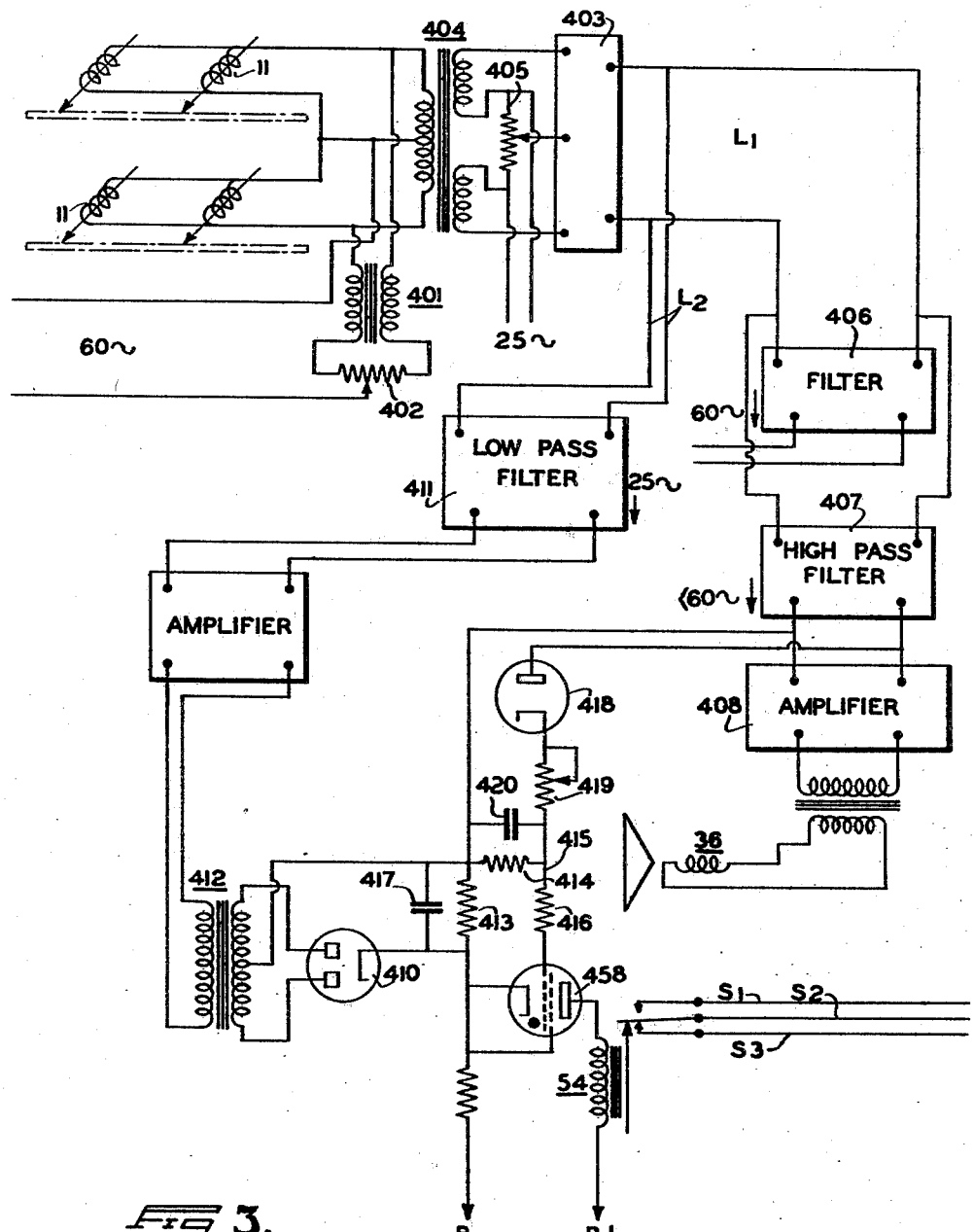

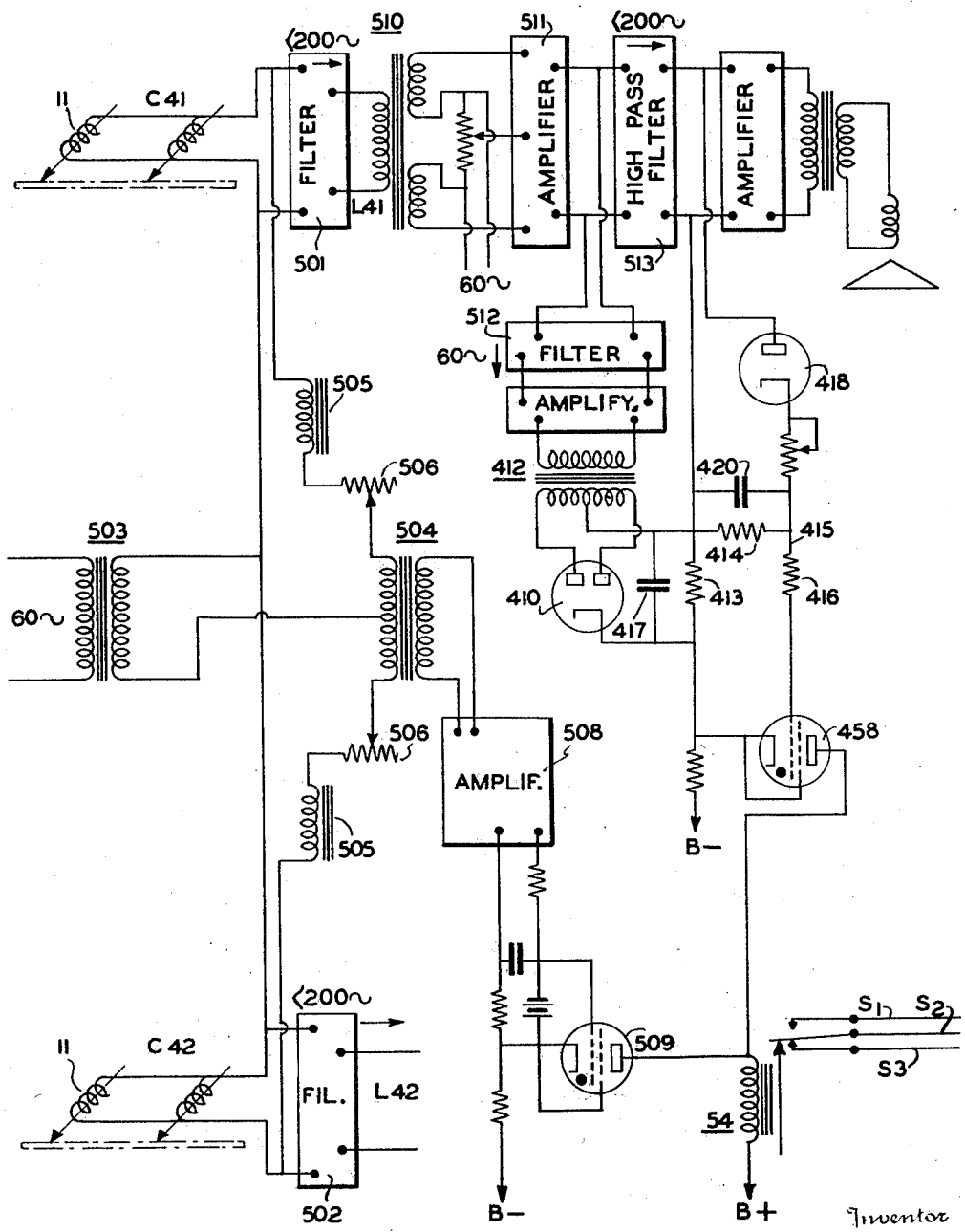

2,435,996

UNITED STATES PATENT OFFICE 2,435,996

DETECTING AND ALARM SYSTEM

Clyde W. Baird, Columbus, Ohio

Application April 1, 1943, Serial No. 481,421

10 Claims. (Cl. 177—352)

1

This invention relates to a detecting and alarm system and more particularly to an electrical system for policing premises in which the detecting stations may be variable in number and spacing and located at points near or widely separated from the guard station containing an amplifying and converting apparatus of the system. To this end the system of the invention possesses a substantially higher degree of flexibility and control sensitivity than has heretofore been obtained in comparable devices as well as other improved features of construction and operation which will be hereinafter broadly included in a statement of the objects of the invention and specifically described in connection with certain representative commercial embodiments of the system.

Among the more important objects of the invention is the provision of a practical and durable detecting and alarm system which is highly reliable and sensitive in its operation, which is at once operable to furnish an awakening alarm in the event of any disturbance and to provide an audible indicia of the happenings at the point or points of disturbance whereby an intelligent course of action may be at once instigated, but which nevertheless may be constructed at reasonable cost and in such physical embodiment that its reliable operation under the control of the ordinary guardsman is insured.

A more specific object of the invention is the provision of a simple but highly efficient arrangement for patrolling the operation of both the outlying pickup channel or channels and the essential circuits of the amplifying and controlling assembly whereby a deficiency in any of these facilities is immediately indicated, thereby insuring a proper operation of the entire system at all times. In accordance with the preferred embodiment and use of the invention the pick-up devices positioned at the various detecting stations each comprises a mechanical vibration-electrical transducer, preferably of the electromagnetic type, in which the mechanical operating element is rigidly coupled to a vibratile enclosure such as a wire fence enclosing an industrial plant. In this installation the patrolling is accomplished by sending out through the pick-up channels, including the coils of the transducers, a signal frequency substantially

2 lower than the frequencies normally generated by the transducers and impressing this low frequency signal on the same amplifying channel as is employed for the signals generated by the transducers. The pick-up lines and the transducer coils are so coupled so that any change in the impedance of the composite pick-up channel will be at once reflected in a change in the patrolling frequency strength in the amplifier channel. After amplification the patrolling frequency is filtered out, rectified, and impressed on one side of a balancing device as a Wheatston bridge, for example, and an equivalent circuit impresses energy from the same low frequency emitting source as furnished the patrolling frequency on the pick-up channel on the other side of the balancing device so that an effective and continuous monitoring of the essential parts of the system is maintained. In larger systems the equivalent circuit may be dispensed with by employing two complete pick-up channels and separate associated amplifiers and balancing the patrolling signal as received through one set against the patrolling signal as received through the other set.

A further object of the invention is the provision in a system of the general character outlined of an arrangement whereby both an audible and a visual alarm or signal is effected upon the unbalance of the system as results from either an intrusion or from a defect in the system, and of an improved method of maintaining such alarm or signal after the cessation of the initial cause until the system is manually reset by the guardsman. This is accomplished, in accordance with the preferred embodiment of the invention by powering the relay controlling the alarm or signal through gas filled discharge devices which, when once rendered conductive, continue to conduct until the plate current is interrupted. A manually operable switch is provided to momentarily short the plate circuits thus restoring the system to its initial condition of readiness, provided, that the signal is not the result of continuing defective operation.

Another object of the invention is the provision in a system of the general character outlined employing thermionic amplifiers and control devices of a practical arrangement to stabilize the voltage of the rectified power supply and to sound an alarm in the event of failure of such supply whereby the reliability of the operation of the complete system is further guarded.

Yet another object of the invention is the provision in a system of the character described employing a bridge to indicate the balance in separate patrolling circuits of an arrangement for giving a visual indication of the degree of balance or unbalance in the bridge whereby further monitoring of the operation of the complete system, may be effected. A still further object of the invention is the provision in a system of the specific character described of an efficient arrangement for controlling the average voltage differential appearing across the bridge when the assembled apparatus is in operating but quiet condition and for indicating the state of the predetermined differential whereby the state of readiness of the apparatus may be instantaneously checked at all times. This feature is of particular advantage where more than one pick-up and amplifying channel is employed since the strength of the received patrolling signal or signals which determines the voltage differential on the bridge is an effective indication of the condition of the pick-up circuits and of the operation of the amplifying devices.

The above and other objects and advantages of the invention will become apparent upon a consideration of the following detailed specification and the accompanying drawings wherein there is specifically disclosed certain preferred practical embodiments of the invention.

In the drawings:

Figure 1, consisting of parts 1A and 1B on two sheets, is a circuit diagram of a detecting and alarm system, constructed in accordance with the principles of the invention, employing one pick-up channel;

Figure 2, consisting of parts 2A and 2B on two sheets, is a circuit diagram of a detecting and alarm system, constructed in accordance with the principles of the invention, in which two separate and independent pick-up and amplifying channels are employed;

Figure 3 is a circuit diagram of a further modified form of detecting and alarm system construed in accordance with the principles of the invention; and Figure 4 is a partial circuit diagram of yet another modification of the invention.

In the illustration of the first embodiment reference numeral 10 indicates a vibratile member or structure as, for example, a woven wire fence enclosing an industrial plant and to which is mechanically coupled the operating element or elements of one or more mechanical vibration-electrical transducers 11 which are of the electromagnetic type, as stated. The coils of the pick-ups 11 are connected to the line which consists of the conductors 12 and 13 in a series-parallel relation, a parallel set of two coils being connected in series with one or more sets each having two coils in parallel. Any number of transducers may be employed but if more than one is used they are preferably coupled in groups of two each as shown.

Conductors 12, 13 are connected to the sections 14 and 15, respectively, of the split primary of an input transformer 16. The other terminals of the primary sections are connected to the conductors 17 and 18 which in turn are connected together through the resistances R1. To provide the patrolling signal strength any suitable source of oscillations which has a frequency outside of the band of frequencies normally generated by the pick-ups 11 may be employed but for simplicity of construction and operation it is preferable to utilize the low frequency of the commercial sixty cycle power supply and this has accordingly been done in the preferred embodiment of the invention. Reference numerals 19 and 20 represent the conductors of a sixty cycle source of energy and connected across this line is the primary 21 of a transformer 22. Transformer 22 is provided with two secondary windings 23 and 24, the first of which is connected across the conductors 17 and 18 through the parallel resistance R2 and the variable series resistance R4. It should be apparent that a source of patrolling frequency current, the strength of which may be controlled by R4, may be traced from one terminal of winding 23 through R4, conductor 18, primary section 15, conductor 13, the coils of pick-ups 11, conductor 12, primary section 14, and conductor 17 to the other terminal or winding 23. Resistances R1 are relatively low in value and offer slight impedance to the flow of signal frequency current the transmission circuit of which may be traced from the coils of pick-ups 11 through conductor 12, primary section 14, conductor 17, resistances R1, conductor 18, primary section 15, and back to the coils through conductor 13. There is thus established a constant source of patrolling frequency current and a potential source of signal frequency current both of which are impressed on the primary of the input transformer 16.

The secondary of transformer 16 is connected to a suitable electronic amplifier 25 through the conductors 26', 27' and 28'. Amplifier 25 is preferably of a high gain type having a plurality of push-pull stages resistance coupled.

A second amplifier 26 having the same construction and operating characteristics as the amplifier 25 is employed in a second amplifying and filtering channel which is generally similar to the channel employing the amplifier 25. A source of low frequency patrolling current is provided by the secondary 24 of the transformer 22 which secondary is connected through the resistance R5 with the line conductors 27 and 28 which in turn are connected to the input of the amplifier 26. Connected with the output of the amplifier 26 is a filtering circuit comprising a low pass filter 29 and connected with the output of the amplifier 25 is a filtering circuit comprising a low pass filter 30 and a high pass filter 31. There is thus provided two separate amplifying and filtering channels, one of which is arranged to receive and act on both the signal frequencies as generated by any one or more of the coils 11 and patrolling frequencies while the other channel (in the embodiment of Figure 1) is arranged to receive patrolling frequencies from the same source which furnishes patrolling frequency to the first channel.

The signal frequencies passed by filter 31 are impressed through conductors 32 and 33 on certain of the grids of the vacuum tubes 34 which, in the embodiment of Figure 1, serve simply as amplifiers and the output of the same is further amplified in the push-pull stage employing the tubes 35. The output of tubes 35 drives loudspeaker 36 through the output transformer 37 and the coupling transformer 38. It is thus made apparent that the vibrations sensed by the pick-ups 11 are reproduced audibly in the loudspeaker 36.

Low frequency signals passed by the filter 30 are conducted through wires 39 and 40 to an amplifier 41 and the patrolling frequency current passed by the filter 29 is conducted through wires 42 and 43 to a separate amplifier 44. Coupled with the output of amplifier 41 through transformer 45 is a full wave rectifier 46 and coupled with the output of the amplifier 44 through transformer 47 is a full wave rectifier 48. The outputs of the rectifiers 46, 48 are impressed across a bridge consisting essentially of the load resistors 49 and 50 and the center tap resistors 51 and 52. As shown, the anodes of the rectifiers are, through the center taps of the secondaries of the transformers 45 and 47, connected together by conductor 53 which point of connection also constitutes one terminal of each of the resistors 49 and 50. The cathode of rectifier 46 is connected to one terminal of the resistance 51 and also to the other terminal of the load resistor 49 at point B1. Likewise the cathode of rectifier 48 is connected to one terminal of the resistor 52 and also to the other terminal of the load resistor 50 at point B2. The other terminals of the resistors 51 and 52 are connected together and to ground and it should be apparent that upon the reception of equal signal strength at both the amplifiers 41 and 44 the points B1 and B2 of the bridge circuit will remain at equal positive potential and the bridge will be in balance. If, however, the signal received at amplifier 41 is appreciably increased in strength as would be the result of a decrease in the impedance of the pick-up circuit 12, 13 caused, for example, by tampering with the line, a greater potential difference will be developed across resistor 49 which will increase the positive potential of point B1 with respect to point B2. Likewise an increase in the patrolling signal strength as rectified by tube 48 will make point B2 more positive than point B1 thus also unbalancing the bridge.

A relay 54 having an operating coil 55 and switch contacts S1, S2 and S3 is employed to control the visible or audible indicators or alarms provided. Coil 55 is arranged to be energized through any one of the controlled gaseous discharge devices 56, 57 or 58 the function and operation of which will now be described. The control grid 59 of the tube 56 is connected through the resistance R8 with the point B1 of the bridge circuit while the control grid 60 of the tube 57 is connected through the resistance R9 with the point B2 of the bridge circuit. The grid bias of the tubes 56 and 57 is controlled by connecting the cathodes thereof through the conductors 61 and 62 with the movable contact of a voltage dividing resistance 63 which is in series between ground and a constant D. C. potential.

In operation, the potential of the cathodes of the tubes 56 and 57 is so adjusted at 63 that the normal quiet condition positive potential existing at the points B1 and B2 is insufficient to start either of the tubes conducting. If, in this quiet condition of the system, any appreciable change in the impedance of the pick-up channel 11, 12, 13 is effected or if any appreciable change in the transmission or amplification of the patrolling frequency current occurs in either of the amplification channels the bridge circuit will become unbalanced and one or the other of the tubes 56 and 57 will start conducting to energize relay 55. It will be obvious that a predetermined increase in positive potential at the point B1, as would be caused by a decrease in impedance in the pick-up channel, for example, will cause tube 56 to conduct while a decrease in the positive potential at the point B1, as may be caused by an increase in impedance of the pick-up channel or by a decrease in the gain of amplifiers 25 and 41, for example, will unbalance the bridge and current will flow through the bridge from point B2 to point B1 thereby increasing the positive potential at point B2 and causing tube 57 to conduct. A fairly large condenser 64 is connected across the cathode and control electrode of each of the tubes 56 and 57 to give an accumulator or a short delaying action to prevent false operation of the system.

A power supply, comprising a transformer 65 having its primary connected across the sixty cycle line 19, 20, a full wave rectifier 66, and a smoothing filter consisting of the series chokes 67 and the parallel capacitors 68, is provided. A voltage regulating tube 69 is connected across the output of the power supply to provide a constant plate potential to insure the proper operation of the system, particularly the maintaining of the adjusted average potential appearing across the bridge circuit. Connected across the output of the power supply is a relay 70 having switch contacts 71, 72 and 73 and the function of this relay is to indicate any interruption or predetermined decrease in the power supply. To this end there is provided an indicating and alarm circuit consisting of line conductor 20, conductor 74, switch contact 72, conductor 75, a buzzer 76, and conductor 77 leading to line conductor 19. In parallel with buzzer 76 is a red indicating light 78. The normal position of the movable contact 72 of relay 70 is as shown in Figure 1B. Upon any interruption or predetermined decrease in the output of the power supply the relay operates to close contacts 71 and 72 thereby energizing buzzer 76 and indicating light 78.

Movable contact S2 of relay 54 is, in the quiet condition of the system when none of the tubes 56, 57 and 58 are conducting, in contact with S3 and in this condition of the system a "clear" indicator consisting of a white light 79 is energized by the circuit consisting of line conductor 20, conductor 74, relay contacts 72 and 73, conductor 80, relay contacts S2 and S3, indicator 79, conductor 81, and conductor 77 to line conductor 19. Upon actuation of any of the tubes 56, 57, 58 relay 54 operates to close contact S2 against S1 thereby energizing the alarm and indicating devices 76 and 78.

Tube 58 is arranged to be actuated upon the attainment of a predetermined signal frequency strength at the controlling and amplifying apparatus and for this purpose leads 82 and 82' are taken from the output of filter 31. The signals received in conductors 82 and 82' are amplified at 83 and the voltage developed across resistor 84 by the output of amplifier 83 is impressed on the control grid 85 of the tube 58 through the condenser 85 and resistance 86. Variable grid bias for the tube 58 is provided by the voltage dividing resistor 87 in series between ground and the conductor 88 which, as shown, leads to the positive side of the power supply output. The cathode bias on tube 58 is so adjusted that the tube is non-conducting when the strength of the signal impressed on grid 85 represents merely the normal background noise level. Any disturbance out along the pick-up channel however, will increase the strength of the signal impressed on grid 85 thereby rendering tube 58 conducting. A capacitor 89 is connected across the cathode and control grid of the tube 58 thus providing an accumulating or delaying action to prevent false operation of the system, particularly at high signal frequencies, steep wave front signals, etc.

It should now be apparent that the system of the invention provides for the continuous patrolling of the pick-up channel and the continuous monitoring of the operation of the controlling and amplifying assembly of the system. Both a visible and an audible alarm is effected either upon the occurrence of any defect in the operation of the system or upon the receipt of any intelligence directly from any of the pick-ups 11. Thus the guardsman is forcibly notified of the receipt of intelligence and he can immediately direct his attention to the audible output of the loudspeaker 36, the continuous operation of which is not interrupted.

It should be observed that by reason of the character of the relay tubes 56, 57 and 58 and their capacitor coupling any disturbance of predetermined intensity and duration will start one of the tubes to conduct and the same continues to conduct even after the withdrawal or cessation of the disturbing factor. The alarm and signal devices 76 and 78 will therefore continue to function until the system is manually reset. This manual resetting is accomplished by the push button 90 which grounds the plate circuits for tubes 56, 57 and 58 through coil 55, conductor 91, and conductor 99. It should be observed that the conductor 88 provides the path for the flow of current between the power supply and the tubes 56—58. A suitable protective resistance may be placed in conductor 91 to further limit the current while switch 90 is closed if necessary. When switch 90 is closed conduction is, of course, extinguished in each of the tubes 56—58 and upon opening of the switch the system will remain in its quiet ready condition unless the disturbing factor is continuing. It can readily be determined by listening to the loudspeaker whether the continuing disturbing factor is the receipt of intelligence from any one or more of the pick-ups or is an indication of improper operation of the system.

To aid in the latter diagnosis as well as to assist in the setting up of the system and the further monitoring of the operation of the system it is highly desirable to provide some visible indication of the value of the positive potential appearing at the points B1 and B2 of the bridge and of the degree of balance or unbalance of these values. This is accomplished, in the preferred embodiment of the invention, by providing a double electron ray or "eye" tube 92 the control electrodes 93 and 94 of which are connected to the plates 95 and 96, respectively, of the amplifiers 97 and 98. The control grid of tube 97 is connected to the junction B2 of the bridge circuit through conductor 100 while the control grid of tube 98 is connected to the junction B1 of the bridge through conductor 101. The value of the positive potentials at the points B1 and B2 is thus indicated by the extent of the shaded area on the targets of the respective sections of the electron-ray tube 92 while the degree of balance may be readily determined by comparing the extent of the shaded area of one section with the shaded area of the other section. In setting up the system the resistance R4 which controls the strength of the patrolling signals impressed on the pick-up channel is adjusted so that, in the quiet condition of the apparatus, the strengths of the patrolling frequency signals rectified at 46 and 48 are substantially equal. The biasing resistors 63 and 87 are now adjusted with such finesse as is required to arrive at the desired degree of operating sensitivity.

In the modification of the invention illustrated by Figure 2 of the drawings substantially the same general combination and organization of parts is employed as in the embodiment of Figure 1. The essential difference between the embodiments is that in the modification of Figure 2 two separate and distinct pick-up channels are employed, the signals from one channel being diverted through one of the two amplifying and filtering channels of the apparatus while the signals received from the other pick-up channel are passed through the other amplifying and filtering line of the apparatus. A patrolling frequency is impressed on each section and primary monitoring of the operation of the entire assembly is effected by balancing the output patrolling frequency strength of one section against that of the other section. In the drawings the parts in Figure 2 which correspond in structure and function with parts of the Figure 1 bear the same reference numerals as in Figure 1 and the following description will therefore be more or less restricted to the differences in the systems.

Conductors 212 and 213, corresponding in general to the line 12, 13 of Figure 1, connects the primary sections 14 and 15 of the input transformer 16 with the pick-ups 11, here shown as two in parallel which are mechanically connected with the fence or other vibratile structure 210. Patrolling frequency current is furnished this pick-up circuit by the secondary winding 23 of the transformer 22. An input transformer 216 having two primary sections 214 and 215 is provided for the amplifier 26 and connected through the windings 214 and 215 by means of the conductors 312 and 313 are the two pick-ups 11 in parallel. These latter pick-ups have their operating elements rigidly connected with a fence or other vibratile structure 310. As in the first described embodiment the number and disposition of the pick-ups employed in each channel may be varied. Patrolling frequency current is supplied the circuit 312, 313 by secondary winding 24 of transformer 22 through conductors 217, 218, and variable resistances 2R4. It should be apparent that the amplifier 26 will be supplied with both patrolling frequency signals and higher frequency signals as generated by the structure 310 through the coils 11 associated therewith.

The output of amplifier 26 is segregated as to frequency by the low pass filter 29 and the high pass filter 231. The high frequency signals passed by filter 231 are transmitted along the conductors 232 and 233 to the amplifier 34, 35, the output of which drives the loud-speaker 36 through the coupling transformer 38. It will be observed that when the system of Figure 1 is modified to employ two separate pick-up channels as in Figure 2 the amplifier tubes 34 (Figure 1) serve also as mixer tubes thereby enabling the same push-pull amplifier (tubes 35) and the following loudspeaker to amplify and reproduce intelligence received from either one or both of the channels. This is readily apparent from Figure 1 which shows the tube circuit more in detail.

The modification of Figure 2 employs two alarm relays in place of the single alarm relay 55 of Figure 1, the relay 254 serving the channel of the structure 210 and the relay 354 serving the channel of the structure 310. It will be observed that the coil 255 of the relay 254 is in the plate circuit of the tube 56 whose operation is controlled by the value of the potential appearing at the point B1 of the bridge circuit. Coil 355 of relay 354 is in the plate circuit of the tube 57 whose operation is controlled by the potential at the point B2 of the bridge circuit. The first channel is provided with visible indicators consisting of the white "clear" 279 and the red "warning" light 278 and an audible alarm consisting of the buzzer or bell 276, all under the control of the relay 254 and energized from the line 19, 20 as shown. The second channel, i. e. from structure 310, is provided with corresponding devices 376, 378 and 379, all under the control of the relay 354.

Relay coil 255 is also in the plate circuit of the tube 58 the operation of which is controlled in accordance with the strength of the output of the amplifier 83 which, in turn, receives its signals through the conductor 82 from the filter 31. In the other channel a lead 282 is taken at the output of the filter 231 and these signals after being amplified by amplifier 283 are impressed on the control grid of a grid controlled gaseous discharge device 258 the plate circuit of which includes the operating coil 355 of the relay 354. The control point of the tubes 58 and 258 may be readily adjusted by varying the cathode bias at 87 and 287, respectively.

When the system of Figure 2 is in its quiet or steady state condition its relays are in the positions shown and the tubes 56, 57, 58 and 258 are so biased that a slight increase in a positive direction of their control grid potentials will start conduction in one or more of them. Thus it will be understood that any decrease of impedance in the pick-up channel 212, 213, for example, will increase the potential at junction B1 of the bridge and cause 56 to conduct thereby energizing relay 254 thus energizing alarms 276 and 278. Likewise a decrease of impedance in the other pick-up channel will cause tube 57 to conduct thereby energizing relay 354 and consequently alarm devices 376 and 378 to give an indication of tampering with the line. To warn the guardsman of a receipt of intelligence from either channel the start of the receipt of such intelligence will cause either tube 58 or 258 to conduct thus also energizing one or the other of the relays to effect the alarm and to indicate the locality (channel) about which movements are taking place. Also any increase in the impedance of the pick-up line in either channel or any decrease in the gain of any of the amplifiers in either channel will likewise give an alarm. For example, if the circuit which includes the conductors 212, 213 is broken the bridge will become unbalanced resulting in the flow of current from the junction B2 to the junction B1 thereby increasing the positive potential on the control grid of tube 57 whereupon the same begins to conduct and energizes relay 354. While this operation is a reverse indication of the channel in which the trouble lies the same is not particularly objectionable in actual operation since the operator or guardsman can readily determine the fact by an inspection of the eye tube 92.

As in the first described embodiment a push button 90 is provided to bypass the plate circuits of the tubes 56, 57, 58 and 258 to ground to halt conduction through any and all of them thereby providing a manual reset for the system.

It is desirable to indicate the average potential developed across the bridge circuit and for this purpose there is provided an electron-ray or eye tube 102 the control electrode of which is connected to the plate of an amplifier 103. The cathode of tube 103 is connected to ground as is also the junction between the resistances 51 and 52 of the bridge circuit. The grid of tube 103 is connected through resistance 104 to the bridge junction 53. It will therefore be observed that as the average voltage differential across the bridge changes the bias of the grid of the triode unit of the eye tube 102 varies accordingly and by adjustment of the plate potential by means of the variable resistor 105 it is possible to so adjust the indicator that the optimum differential will be represented by a desired extent of shaded area on the target of the tube.

The modification of Figure 3 employs patrolling currents of two different frequencies and illustrates how, in accordance with the principles of the invention, an integrating circuit may be employed to provide for the requirement of any desired degree of signal condition persistency in the operation of the alarm relay. The latter feature is of particular utility in connection with the operation of the alarm in response to higher signal frequency strength and variation in the wave form of the received signals. In this modification, the pick-ups 11 are connected in parallel in each of the two branches of a single three-wire channel. A patrolling signal of suitable frequency, 60 cycles per second for example, is impressed on each branch of the channel, uniformity of strength in their respective branches being accomplished by the inter-reactor 401 and the voltage dividing resistor 402. The pick-up channel thus provided is coupled to a push-pull amplifier 403 through a coupling transformer 404 having a split secondary connected by a resistor 405. Connected across resistor 405 and consequently impressed on the input of amplifier 403 is a second source of patrolling current having a frequency different from the frequency impressed on the pick-up channel. The frequency of the patrolling current impressed at the amplifier 403 may be of the order of 25 cycles per second for example. The output of amplifier 403 after passing through filter 407 is further amplified at 408 and utilized to drive the loud speaker 36 or other reproducing means as will be understood. In this modification relay 54 corresponding in construction and function with the relay 54 of Figure 1 is arranged to be energized by a grid-controlled gas-filled discharge device 458 corresponding to the tube 58 in Figure 1. Tube 458 is normally held non-conducting by the output of a rectifier 410 which derives its energy from the lower patrolling frequency strength through the lines L1 and L2, filter 411, an amplifier, and transformer 412. The output of rectifier 410 is developed across resistor 413, the negative end of which is connected to the control grid of tube 458 through resistor 414, conductor 415, and grid resistor 416. Stabilization is attained by the parallel capacitor 417.

Resistor 414 is connected across the output of filter 407 through the rectifier 418 and variable resistance 419 which are in series. As indicated, filter 407 is constructed to pass frequencies of 60 cycles per second and higher while filter 406, which is also connected to line L1, is constructed to pass frequencies of about 60 cycles only. Thus the voltage developed across the resistor 414 is a function of the composite strength of the higher patrolling frequency and the signal frequencies generated by the pick-ups 11. It will be observed that with respect to the conductor 415 the potential developed by rectifier 418 is in opposition to the potential developed by rectifier 410 and, in operation, the potentiometer 419 is so adjusted that the normal line level disturbances and strength of the higher patrolling frequency are sufficient only to maintain the potential in conductor 415 slightly below that required to trip the tube 458. If now a signal is received the control grid of tube 458 will be driven more positive thus causing the tube to conduct thereby energizing the relay 54 and sounding the alarm. A capacitor 420 is in parallel with resistor 414 to provide for the desired persistency in incoming signal strength to thereby guard against false operation of the system. The value of capacitor 420 is selected with regard to the particular degree of accumulative action desired.

It will be observed that any material decrease in the efficiency of the amplifier 403 will be reflected in the output of rectifier 410 and when the voltage developed across resistor 413 decreases a predetermined amount with respect to the voltage developed across the resistor 414 the tube 458 will begin to conduct to set the alarm as explained. It should be understood that in the system of Figure 3, as in the embodiments of Figures 1 and 2, a second gas-filled discharge device, not shown, may be employed to energize relay 54 in response to a predetermined decrease in the output of filter 406. Thus, any decrease in impedance in the pick-up channel, as caused by shorted conductors for example, will operate relay 58 due to the greater increased 60 cycle strength at the rectifier 418 while an increase in impedance, as caused by an open conductor, for example, will cause the alarm to be operated by the said second gas-filled tube.

The modification of Figure 4 illustrates another method how two separate and distinct pick-up channels may, in accordance with the principles of the invention. be coupled to the amplifying, operating and/or reproducing assembly of the system and it further teaches how a system constructed generally according to the embodiment of Figure 3 may be successfully operated with patrolling currents of a single frequency. To provide for both these purposes each channel, marked as C41 and C42, respectively, is connected directly to a filter the output of which is impressed through a coupling transformer on the amplifier and following equipment of the unit. As shown, filter 501 is in channel C41 while filter 502 is in channel C42 and both these filters are constructed to pass only those frequencies which are considerably higher than the frequency of the patrolling current employed and, in actual practice, assuming a patrolling frequency of 60 cycles per second the filters may be devised to have a lower limit of approximately 200 cycles per second. The channel patrolling current is impressed through a transformer 503 and the opposite sections of a center-tap primary winding of a transformer 504. In the impressing circuit of each channel is located a reactor 505 and a variable resistance 506 whereby the patrolling signal strength in the respective channels may be equalized. The secondary of transformer 504 is connected to the input of an amplifier 508. The output of amplifier 508 is impressed across the cathode and control grid of a gas-filled discharge device 509 which is normally held nonconducting and it should be apparent that so long as the total impedance in each of the channels C41 and C42 is matched the flow of current in each section of the primary winding of transformer 504 will be equal and opposite thus inducing no current in the secondary of this transformer. If there is any change in impedance in either of the channels the condition of unbalance will induce patrolling frequency strength in the amplifier 508 and when the amplitude and persistency is sufficient to overcome the normal negative bias on tube 509 the tube will conduct thereby actuating relay 54. It will be understood that in this modification, as well as in the embodiments of Figures 1, 2 and 3, the alarm relay remains actuated until manually reset because of the action of the gas tubes in control of its operation.

Incoming signal strength from channel C41 after passing through filter 501 is impressed on a line L41 and thence through a coupling transformer 510 on the input of an amplifier 511. A patrolling current which may be of the same frequency as that impressed on the pick-up lines is impressed on the amplifying channel through the secondary of transformer 510. In this embodiment the filter 512 corresponding in general to the filter 411 of Figure 3 is designed to pass frequencies up to approximately 60 cycles per second, this being the patrolling frequency employed, while the filter 513, corresponding in general to the filter 407 of Figure 3 is designed to pass only frequencies above approximately 200 cycles. Otherwise the operating circuits for relay 54 acting through the tube 458 are exactly like the corresponding circuits in Figure 3 and need not be further described. Further, since the circuit following the line L42 is identical with the circuit following the line L41, the former are not shown nor described. It should be understood, however, that if desired the respective channels may operate separate alarm relays or other means to indicate the particular channel in which an alarm is present or which is not functioning properly.

It should now be apparent that I have provided an alarm and detecting system which accomplishes, in a practical manner, the objects initially set out. The system provides for the amplification and reproduction of any vibration or noise originating in or about the premises or structures being protected and at the same time provides suitable alarms and indicators for warning of any tampering of the system, of any deficiency appearing in the operation of the system, and of the start of the reception of any intelligence from the premises or structures being protected. These objects are accomplished almost entirely by the use of standard electrical parts the reliability and general merit of which is proven by common usage in communication, control and other fields.

The above specifically described embodiments of the invention should be considered as illustrative only as obviously many changes may be made therein without departing from the spirit or scope of the invention. Reference should therefore be had to the appended claims in determining the scope of the invention.

What I claim is:

1. A detecting and alarm system comprising a pick-up circuit having a detecting station, a pair of amplifying channels, a connection between said circuit and the input to one of said channels, a source of oscillations of a frequency outside the band of signal frequencies normally detected at said station, said source being connected in series with said circuit, a connection between said source and the input to the other of said channels, a filter in said one of said channels for passing said band, means to audibly reproduce the signal frequencies of said band, a filter in each of said channels for passing the amplified oscillations, means to amplify and rectify the output of each of said oscillation frequency filters, a device to balance the output of said rectifiers, an alarm, mean responsive to the attainment of a predetermined strength in said band frequency signals in control of the operation of said alarm, and means responsive to a predetermined condition of unbalance in said device in control of the operation of said alarm.

2. A detecting and alarm system comprising a pair of pick-up circuits each having a detecting station, a pair of amplifying channels each having its input connected to one of said circuits, a source of patrolling signals of a frequency outside the band of frequencies normally detected at said stations, said source being connected in series with each of said circuits, each of said channels being provided with frequency discriminating networks to segregate said band and patrolling frequencies, means to audibly reproduce the signals of band frequency, means to amplify and rectify the diverted signals of patrolling frequency in each channel, a device to balance the rectified signal strength of one channel against the rectified signal strength of the other channel, an alarm, means responsive to the strength of the amplified band frequency signal in control of the operation of said alarm, and means responsive to a condition of unbalance in said device in control of the operation of said alarm.

3. A detecting and alarm system comprising a pair of pick-up circuits each having at least one detecting station, a pair of amplifying channels each having its input coupled with one of said circuits, means to impress a patrolling signal of frequency outside the band of frequencies normally detected at said stations on each of said circuits, a frequency discriminating network in each of said channels to segregate the amplified signals of patrolling frequency from those of said band frequencies, a receiver for the latter, an alarm, means responsive to the strength of the received band frequency signals in either of said channels in control of the operation of said alarm, and means responsive to a predetermined unbalance in the strength of the amplified patrolling frequency signals in the respective channels in control of the operation of said alarm.

4. A detecting and alarm system comprising a pair of pick-up circuits each having at least one detecting station comprising a mechanical vibration-electrical transducer, a pair of amplifiers each having its input coupled with one of said circuits, means to impress a patrolling signal of frequency outside of the band of frequencies normally generated by said transducers on each of said circuits, a frequency discriminating network following each of said amplifiers to segregate the amplified signals of patrolling frequency from those of said band frequencies, a reproducer for the latter, an alarm, and means responsive to a predetermined unbalance in the strength of the amplified patrolling frequency signals as received from the respective circuits in control of the operation of said alarm.

5. Apparatus according to claim 4 further characterized in that said last mentioned means comprises a bridge circuit, a pair of vacuum tube rectifiers to rectify the amplified patrolling frequency current as received from the respective circuits, the cathodes of said rectifiers being connected to opposed junctions of said bridge circuits, a pair of gas filled discharge devices either of which when conducting is operative to actuate said alarm, the control grids of said discharge devices being connected to said junctions.

6. Apparatus according to claim 4 further characterized in that said last mentioned means comprises a bridge circuit, a pair of vacuum tube rectifiers to rectify the amplified patrolling frequency current as received from the respective circuits, the cathodes of said rectifiers being connected to opposed junctions of said bridge circuit, a pair of gas filled discharge devices either of which when conducting is operative to actuate said alarm, the control grids of said discharge devices being connected to said junctions, and means to indicate the average voltage impressed across said bridge by said rectifiers.

7. Apparatus according to claim 4 further characterized in that said last mentioned means comprises a bridge circuit, a pair of vacuum tube rectifiers to rectify the amplified patrolling frequency current as received from the respective circuits, the cathodes of said rectifiers being connected to opposed junctions of said bridge circuit, a pair of gas filled discharge devices either of which when conducting is operative to actuate said alarm, the control grids of said discharge devices being connected to said junctions, means to indicate the degree of balance or unbalance in the positive potentials appearing at said junctions, and means to indicate the average voltage difference impressed on said bridge by said rectifiers.

8. A detecting and alarm system comprising in combination a pair of amplifying channels each having an associated filtering network to segregate amplified signal frequency currents from amplified patrolling frequency current, at least one of said amplifiers having an associated pickup circuit fed by a mechanical vibration-electrical transducer, means to impress a patrolling frequency current on both of said amplifiers and on said circuit or circuits, means to rectify the patrolling frequency output of said amplifiers, a bridge circuit of load and equalizing resistances, the positive output terminals of said rectifiers being connected to opposed junctions of said bridge, an alarm device, means responsive to the positive potential value appearing at either of said junctions in control of the operation of said alarm device, and means to reproduce audibly the amplified signals received from said transducer or transducers.

9. Apparatus of the character described comprising in combination a circuit including a mechanical vibration-electrical transducer, a second circuit including a mechanical vibration-electrical transducer, means to impress a patrolling voltage on each of said circuits, an alarm device, and means responsive to variations in the ratio of patrolling current flowing in the respective circuits in control of the operation of said alarm device whereby an indication is given of any change in impedance in either of said circuits.

10. Apparatus of the character described comprising in combination a circuit including a mechanical vibration-electrical transducer, means to impress a patrolling voltage of predetermined frequency on said circuit, an amplifying channel coupled with said circuit, means to supply a patrolling voltage of a second predetermined frequency to the input of said channel, an alarm, means responsive to the strength of said predetermined frequency signal at the output of said channel in control of the operation of said alarm, and means responsive to the strength of said second predetermined frequency signal at the output of said channel also in control of the operation of said alarm.

CLYDE W. BAIRD.

REFERENCES CITED

The following references are of record in the file of this patent:

UNITED STATES PATENTS

| Number | Name | Date |
|---|---|---|
| 1,192,312 | Hopkins et al. | July 25, 1916 |
| 1,257,440 | Zehden | Feb. 26, 1918 |
| 1,547,873 | Hopkins | July 28, 1925 |
| 1,702,724 | Dewar | Feb. 19, 1929 |
| 1,762,973 | Frederick | June 10, 1930 |
| 2,007,371 | Hopkins et al. | July 9, 1935 |
| 2,009,447 | Hart | July 30, 1935 |
| 2,031,951 | Hartley | Feb. 25, 1936 |
| 2,081,074 | Strauss | May 18, 1937 |
| 2,165,064 | MacKay | July 4, 1939 |
| 2,240,929 | Hays | May 6, 1941 |
| 2,272,998 | Bjornson | Feb. 10, 1942 |
| 2,303,455 | Harder | Dec. 1, 1942 |
| 2,345,771 | Reynolds | Apr. 4, 1944 |

OTHER REFERENCES

Electronics, June 1942, pp. 110 and 112.